United States Patent [19]

Pettersson et al.

[11] Patent Number: 5,337,594
[45] Date of Patent: Aug. 16, 1994

[54] ARRANGEMENT AT PRESS LINE

[75] Inventors: Rolf Pettersson, Sölvesborg; Per-Åke Lidén, Ingenjörsgatan; John-Erik Liljengren, Fläderb/e,uml/a/ rsvägen, all of Sweden

[73] Assignee: AB Volvo, Sweden

[21] Appl. No.: 809,491

[22] PCT Filed: Jun. 29, 1990

[86] PCT No.: PCT/SE90/00470
§ 371 Date: Jan. 10, 1992
§ 102(e) Date: Jan. 10, 1992

[87] PCT Pub. No.: WO91/00784
PCT Pub. Date: Jan. 24, 1991

[30] Foreign Application Priority Data

Jul. 12, 1989 [SE] Sweden .................. 8902521-7

[51] Int. Cl.$^5$ .................................. B21J 13/08
[52] U.S. Cl. .......................... 72/446; 72/405; 72/419; 483/14; 483/28
[58] Field of Search ............... 483/14, 28, 29; 72/446, 72/448, 405, 419

[56] References Cited

U.S. PATENT DOCUMENTS

| | | | |
|---|---|---|---|
| 3,455,141 | 7/1969 | Bracco et al. | 72/446 |
| 3,516,277 | 6/1970 | Bracco et al. | 72/446 |
| 4,614,108 | 9/1986 | Bolle et al. | 72/446 |

FOREIGN PATENT DOCUMENTS

| | | | |
|---|---|---|---|
| 0284413 | 12/1986 | Japan | 72/446 |
| 0144825 | 6/1988 | Japan | 72/446 |

*Primary Examiner*—David Jones
*Attorney, Agent, or Firm*—Burns, Doane, Swecker & Mathis

[57] ABSTRACT

An apparatus is a press line includes presses along a material flow direction for stepwise processing of a workpiece. A transfer device moves each workpiece from one press to the next in the press line. The transfer devices are displaceable transversely of the press line. Further, a carriage is included for each press for transport of tools, the carriage being drivable along tracks. To permit rapid tool change and maximum utilization of the space surrounding the press line, the carriage is provided with a first end portion fitted with equipment for transport of a tool to or from a press, and with a second end portion which carries the transfer device so that this projects cantilevered out from the carriage. The carriage is drivable along the tracks portly to an operative position with the transfer device in between adjacent presses, partly to a tool change position with the first end portion in between adjacent presses, and partly to a position at a tool store disposed along the press line and in spaced-apart relationship therewith, for depositing or collecting a tool.

19 Claims, 7 Drawing Sheets

ARRANGEMENT AT PRESS LINE

TECHNICAL FIELD

The present invention relates to an apparatus in a press line of the type which is primarily intended for the production of vehicle body parts and which includes a number of presses disposed in mutual sequence along a material flow direction for stepwise processing of a workpiece, a transfer device for transferring a workpiece from one press to the next in the press line, the transfer device being displaceable transversely of the flow direction, and at least one carriage disposed at each press and drivable transversely of the flow direction for transporting tools to and from the press, respectively, on tool change.

BACKGROUND ART

A large number of different types of automation equipment are previously known in this art which are employed for transporting a workpiece under processing in a press line from the die, or tool, in one press to the tool in the next press in the press line. This automation equipment is sited in the spaces between adjacent presses and must be moved aside when a truck or railborne carriage which is used for transporting the heavy tool on tool change is to be moved into the region between adjacent presses. The displacement of the transport equipment is often difficult to carry out because of lack of space.

One aggravating factor in connection with tool change according to conventional technology often resides in the fact that the available space surrounding the press line may be extremely limited so that not even displacement of the automation equipment can be put into effect in a simple manner. In addition, the area around the press line is often cluttered with, for example, workbenches, material stockpiles, tool cabinets, safety barriers and similar objects. As a result of the lack of space, manual adjustment work is impeded if not rendered wholly impossible.

Employing prior art conventional technology, the time-loss for tool change is so great that such a press line can hardly be competitive when the requirements on steadily shorter production series become more and more accentuated.

Presses of the "sliding bolster" type are also previously known in the art, in which the tools may be displaced laterally, transversely of the material flow direction, through an opening in the side of the press so that, thereby, the space between adjacent presses need not be taken up in tool change. Presses of this type per se provide for rapid tool change and have high output capacity, but are extremely capital-intensive. One example of a press of this type is described in U.S. Pat. No. 3,455,141.

Presses of the "transfer press" type are also previously known. In this press type, use is made of a plurality of tools in one and the same press. A press of this type makes for rapid tool change and possesses high capacity but, also in this case, the costs involved are prohibitively high. One example of such a press is described in GB-A-2,199,524.

U.S. Pat. No. 3,516,277 discloses a proposed solution to the problem partly of how transport of workpieces between adjacent presses may be put into effect, and partly how tool changes may be carried out with the aid of a carriage movable transversely of the material flow direction of the press.

The design and construction according to this publication entail that the transport equipment is mounted on a separate wheel-borne carriage between adjacent presses, the carriage being interconnected, via connection rods, to that carriage which is employed for transport of dies or tools transversely of the material flow direction of the press line and also being positively displaceable under the action of movement of this latter carriage. The construction according to this publication also includes a drive unit which is housed in the bedplate or floor and is employed to set the tool change carriage in motion.

In practice, the design and construction according to this patent specification are hardly feasible, since they fail to solve the problem inherent in the often extremely limited space surrounding the press line and in between adjacent presses. The pair of carriages together with their connection rods gives a structural dimension transversely of the material flow direction of the press line which, in most cases, is too large for the available space most proximal the longitudinal wall of the press hall. As a decisive disadvantage, mention must also be made of the drive unit housed in the bedplate or floor for the tool change carriage, which implies that the floor space between adjacent presses is not freely accessible for adjustment work, service and the like.

PROBLEM STRUCTURE

Hence, the present invention has for its object to realise an apparatus of the type mentioned by way of introduction, the apparatus being designed in such a manner as to permit very rapid tool changes so that, thereby, older press models may also be employed in an efficient manner in short-series production. The present invention further has for its object to realise an apparatus which renders the floor space between adjacent presses freely available. The present invention yet further has for its object to realise an apparatus which may also be employed in such press lines in which the space in the press line itself and thereabout is extremely limited.

SOLUTION

The objects forming the basis of the present Invention will be attained if the apparatus intimated by way of introduction is characterised in that the carriage is provided with a first and second end portion, the first end portion having means for carrying a tool and for transferring the tool to or from a press, respectively, while the second end portion is provided with means for supporting the transfer device so that this projects out from the carriage.

These design features afford major advantages which may best be illustrated in economic figures. If the investment required for replacing an existing, older, press line by a "transfer press" with six stations is set at 100%, the corresponding investment in replacement by six presses of the "sliding bolster" type will be approximately 125%, while, on the other hand, the investment required for applying the present invention runs only to the order of between 20 and 25%. The production output capacity which is achieved in the different alternatives is 12–13 strokes per minute in a transfer press, 10–11 strokes per minute in a new press line of the sliding bolster type and 8–9 strokes per minute in an older press line designed according to the present invention, with fixed or movable press tables. In all three alternatives, the tool change time amounts to approximately 10 minutes. It will be apparent from the foregoing that between and 4 and 5 older conventional press lines may be retrofitted according to the present invention at the same cost as would be required in installing 1 transfer press with six stations. As a result, production output capacity will be between two and three times higher per invested monetary unit as compared with the alternative employing a transfer press. The time for completing the retrofitting according to the present invention is approximately 1 year, while a new press line or a transfer press requires an installation time of approximately 2-2.5 years. Hence, the pay-off period begins earlier when using the apparatus according to the present invention.

BRIEF DESCRIPTION OF THE ACCOMPANYING DRAWINGS

The present invention will be now be described in greater detail hereinbelow, reference being had to the accompanying Drawings. In the accompanying Drawings.

DESCRIPTION OF PREFERRED EMBODIMENT

Figure 1:
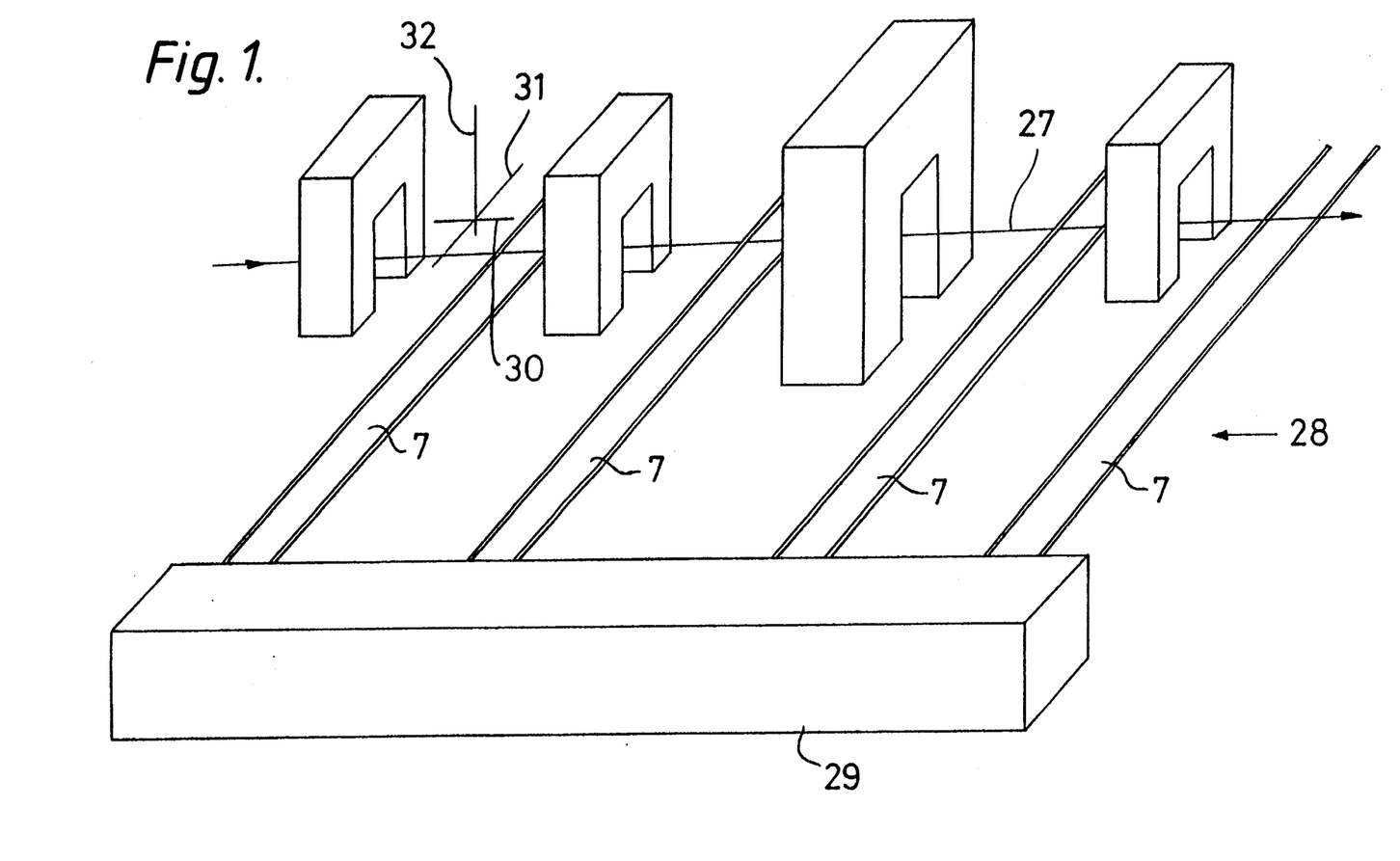
FIG. 1 schematically illustrates in perspective a part of a press line.

Referring to the Drawings, FIG. 1 schematically illustrates a section from a press line which includes a number of presses disposed along a material flow direction 27. In this context, the term material flow direction is taken to signify the major direction along which the workpieces are transported on their processing through the press line. It will thus be clear to the skilled reader that the local flow direction for one workpiece within the press line may deviate considerably from the above-mentioned material flow direction. It will further be apparent from this Figure that tracks 7 are laid in the spaces between adjacent presses and extend transversely of the material flow direction 27 so that, in a direction towards the observer of FIG. 1, they extend out into a transport space 28 which is disposed along the press line and its material flow direction. Preferably, the tracks also extend in a direction towards the observer up to a schematically illustrated tool or die store 29 so that a carriage displaced along one of the tracks 7 may collect a tool from the store 29 and transport this to the space between adjacent presses in order there to execute tool change. To this end, the carriage (not shown in FIG. 1) is provided with means for carrying a tool and for transferring it to or from a press. Such means may, for instance, consist of channels disposed in the carriage and gripping members connected thereto, by means of which the tool is slid into or out of the press in a direction which is approximately parallel to the material flow direction 27.

In a direction away from the observer of FIG. 1, the tracks 7 preferably extend somewhat beyond the press line so that thereby at least the carriage may partly be run out on the distal side of the press line.

In FIG. 1, there are further shown three axes, namely an approximately horizontal axis 30 substantially parallel with the material flow direction, an approximately horizontal axis 31 substantially normal to the material flow direction 27, and a vertical axis 32 substantially normal to the material flow direction. The direction of these axes will be used as references below.

In order, according to the present invention, to transport those workpieces which are processed in the press line, use is made of transport equipment which transfers a workpiece from the tool in one press to the tool in the subsequent press in the press line. This transport equipment includes a transfer device which, in one operative position, is placed in the space between adjacent presses. The transport equipment may further include feeder devices mounted on the presses which lift out a workpiece from a pressing tool and relay this to the transfer device. A corresponding feeder device may be sited on the infeed side of the subsequent press, so that this feeder device collects the workpiece from the transfer device and places it in the correct position in the tool in the subsequent press. Alternatively of course, if feeder devices are employed at all, these may also be integrated in the transfer device.

In its most general form, the present invention implies that the carriage which is employed for transport of tools into the space between adjacent presses carries the transfer device so that this is transported with the carriage, leaving the floorspace free.

Figure 2:
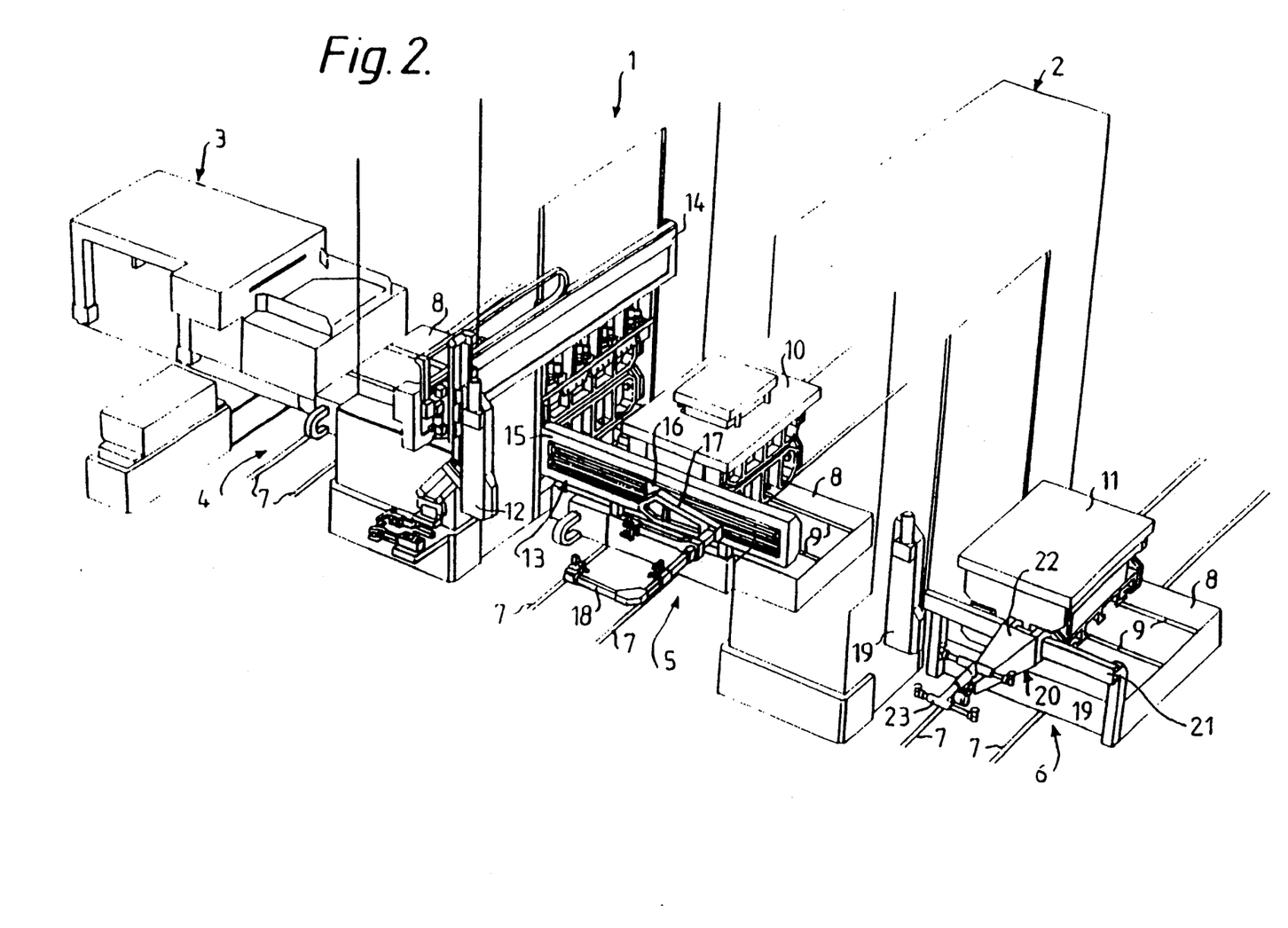
FIG. 2 the infeed end of a press line which is designed according to a first embodiment of the present invention.

FIG. 2 shows the infeed end of a press line in which the first two presses have been given reference numerals 1 and 2, respectively. These presses are illustrated but schematically and with certain parts broken away, since the detailed design of the presses is not germane to the present invention. It is apparent from FIG. 1 that the press line may include a larger number of presses than two, but nor is this number germane to the present invention. As has been intimated above, the presses 1 and 2 in FIG. 2 are disposed in spaced-apart relationship such that a space 5 is formed between the presses 1 and 2, while a space 6 is formed after the press 2. In a corresponding manner, there is a space 4 ahead of the press 1.

Blanks for the sheet metal parts which are to be processed in the press line are supplied via an infeed unit 3 and the blanks are fed from this unit in a direction from left to right in the Figure.

As was briefly mentioned above, tracks 7 in the form of rails or the like, secured in the floor or the substrate, are disposed ahead of the first press 1 in the press line, i.e. in the space 4. The tracks 7 are directed transversely of the longitudinal direction of the press and the material flow direction 27. A carriage 8 runs on each of the tracks 7 and, to this end, is provided with suitable wheels or rollers (not shown). Each of the carriages 8 has a first and a second end portion, in which the first end portion is intended for accommodating a tool and, consequently, is provided with channels 9 which are directed in the longitudinal direction of the press line and are intended to be employed on tool change in the presses, as will be described in greater detail below. Drive means are further provided at the first end portion and engage with the tool to displace the tool to and from the press.

In FIG. 2, the carriages 8 are illustrated in a position for changing tools in the presses 1 and 2. In this instance, a tool 10 is shown on the carriage 8 in the space 5 between the presses 1 and 2, and a tool 11 is shown on the carriage 8 in the space 6 after the second press 2. On tool change in the presses 1 and 2, the tools (for example tools 10 and 11) are displaced along the channels 9 on the carriages 8 to and from their respective places in the presses 1 and 2 in a per se known manner, which will not be described in detail here, since this is a wholly conventional operation.

After completed tool change in the presses 1 and 2, the carriages 8 are displaced along the tracks 7 in a receding direction in FIG. 2. The carriages 8 are thereafter arrested in a position where both they, and the tools disposed on the carriages and no longer intended for use in the presses, are located on one side of the press line and do not encroach upon the spaces 4, 5 and 6. When the carriages 8 are in this position, the press line is ready to be put into production.

When the press line is made operative for production of sheet metal parts, the above-mentioned transfer devices are located in a position for transferring the workpieces from the one press to the other. In addition, means are required for infeed of blanks for the sheet metal parts into the first press 1 and for removing the finished sheet metal parts from the last press in the press line. In the embodiment illustrated in FIG. 2, the transport equipment for transferring workpieces from the tool of the press 1 to the tool of the press 2 consists of a discharge device 12, a conveyor 13 (which constitutes the transfer device) and an infeed device (not shown) which corresponds to the discharge device 12. The discharge device 12 is mounted on a beam 14 on the press 1 and is movable transversely of the longitudinal direction of the press line along the beam 14. In this instance, the discharge device 12 is illustrated in FIG. 2 as laterally displaced out of the press line so as not to impede tool change in the press 1. The infeed device (not shown) is mounted on the press 2 in a corresponding manner. The conveyor 13 consists of a beam 15 along which a slide 16 is shiftably guided. The slide 16 pivotally carries the one end of an arm 17 whose other end supports a gripping member 18 which is U-shaped in the embodiment illustrated in FIG. 2.

Transport equipment is analogously provided in the space 6, this equipment including a discharge device 19 which is but schematically intimated and corresponds to the discharge device 12 on the press 1, and a conveyor 20 mounted on the carriage 8, the conveyor comprising a beam 21 and a slide 22 shiftably guided therealong, the slide carrying a gripping member 23. When the carriages 8 are displaced to their outermost positions on the one side of the press line, as described above, the conveyors 13 and 20 or transfer devices are located in operative positions in the spaces 5 and 6, respectively, between adjacent presses. At the same time, the discharge devices 12 and 19, and corresponding discharge devices which are not shown, are displaced to their operative positions in the press line so that the press line is ready to be put into production. Since the conveyors 13 and 20, respectively, are mounted direct on the second end portions of the carriages and project cantilevered therefrom, time-consuming work involved in removing and reinserting the conveyors will be avoided when tool change is to be carried out in the presses 1 and 2. Furthermore, the floorspace in the spaces 4-6 may be kept completely free apart from the tracks 7, both in the operative position between the presses and in the adjustment position between the press line and the longitudinal wall of the press hall, or any other space-restricting arrangement located along the press line. This entails that certain manual adjustment work may be carried out at the same time as tool change takes place.

DESCRIPTION OF ALTERNATIVE EMBODIMENTS

Figure 3:
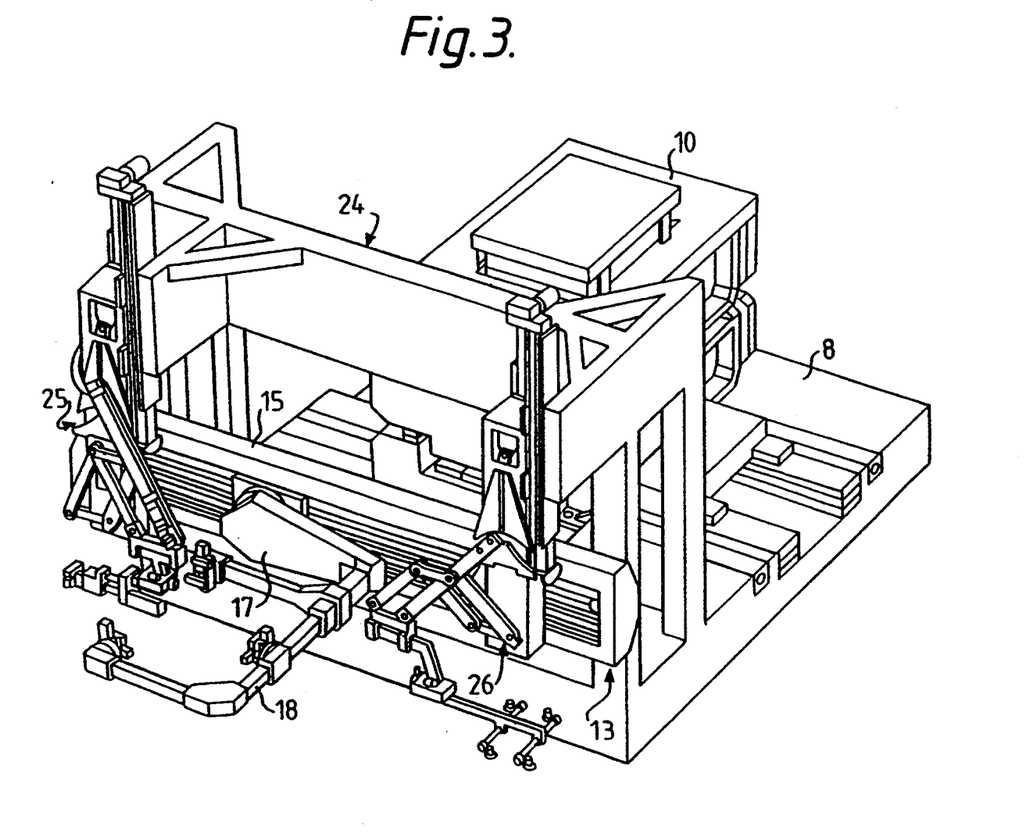
FIG. 3 shows one embodiment of the apparatus according to the present invention.

FIG. 3 shows an alternative embodiment of a carriage for use in the press line according to FIG. 2. Also in this embodiment, the carriage 8 has a first end portion with equipment for accommodating and displacing a tool 10 to or from a press, respectively, on tool change. Furthermore, as has been mentioned above, the carriage has a second end portion which carries the transfer device, preferably cantilevered outside the carriage, so that hereby the floorspace beneath the transfer device may freely be utilised for handling, for example inverting workpieces and for transport to the next press in the line.

The carriage 8 according to FIG. 3 has the conveyor 13 designed in the same manner as illustrated in FIG. 2. However, the carriage according to FIG. 3 is moreover provided with a frame 24 which carries a discharge device 25—which substantially corresponds to the discharge device 12 illustrated in FIG. 2—and further an infeed device 26 which is intended for infeed of workpieces into the press 2. This infeed device corresponds to the infeed device described in conjunction with FIG. 2 but not shown in greater detail.

Thus, in the embodiment according to FIG. 3, the transport equipment for transporting a workpiece from the tool in one press to the tool in the next press is carried in its entirety by the carriage 8. This implies that no arrangements for transporting workpieces in this embodiment need be mounted on the presses proper.

Irrespective of whether the carriage 8 is designed according to FIG. 2 or according to FIG. 3, a control system is coupled to the operation of the press line and the carriage, in which system the arrest positions are registered for the carriage where tool change may take place, in such event these arrest positions being optionally specific to each tool. Furthermore, arrest positions are registered in the control system which imply operative positions for the transfer device, and these arrest positions may also be specific to those tools which are mounted in the presses or, otherwise expressed, to that type of sheet metal part which is to be manufactured. A tool change position for the transfer device is further registered in the control system, in which position the gripping member 18 may, for example, be placed in such a rest position that it does not encroach on the space for other equipment or structural elements disposed in association with the press line.

The invention has been described above as including transport equipment which is, or ideally should be, cantilevered on the carriage 8 which is used for tool change. This formulation also encompasses embodiments (not shown on the Drawing) in which the transport equipment, irrespective of its detailed design, is displaceable in relation to the carriage 8 or in which the carriage is divisible and the parts are displaceable in a horizontal direction along the tracks 7 of the carriage, as shown in FIG. 1. This is achieved according to the present invention in that the transport equipment is connected to the carriage 8 by the intermediary of a displacement arrangement, such as a guideway, a telescopic mechanism or the like.

When an embodiment of this type is reduced into practice, the transport equipment is displaced in towards the carriage 8 when this is run in between adjacent presses for tool change so that the physical constructional dimension may thereby be greatly reduced transversely of the press line in this critical element as regards space requirements. On the other hand, in the operative position, the transport equipment may be displaced a distance from the carriage in order to make room for requisite safety barriers.

The above-described embodiment also includes, in particular if the displacement area for the transport equipment in relation to the carriage is large, variations in which the transport equipment is provided with support means resting against the floor, such as jack feet, trailing wheels or the like. The purpose of such support means is to positionally stabilise the transport equipment when this in operation and, ideally, they may be rendered collapsible on relative movement between the transport equipment and the carriage proper.

The scope of this embodiment also encompasses a variation in which the transport equipment is provided with its own carrier means such as a carriage, trolley or frame which, by means of the above-mentioned displacement arrangement, is connected to the carriage and shiftable in relation thereto.

Specific examples have been described with particular reference to FIGS. 2 and 3 of the transport equipment employed for transporting workpieces from the tool in one press to the tool in the next press. The detailed design of this transport equipment may vary and, similarly, its connection to the carriage 8, but it nevertheless generally applies that the transport equipment is designed in such a manner that it displaces workpieces along one or more of the axes 30–32 illustrated in FIG. 1. Furthermore, the transport equipment may generally be designed in such a manner that it realises, in response to the appearance of the workpiece, a rotation of the workpiece about one or more of the axes 30–32 illustrated in FIG. 1.

The carriages 8 illustrated in FIGS. 2 and 3 are relatively short, which thereby realises a very compact carriage construction. However, it is suitable to provide a free space between the end portions of the carriage which may be utilised as a transport area for personnel. Such a transport area must, however, be separated off from the transport equipment by means of suitable safety barriers.

It may further be advantageous according to the present invention if the transfer device, or possibly the entire transport equipment, is disposed to be raisable and lowerable on the carriage so that the height of the transport equipment can be independently adapted to optional tool height in adjacent presses.

Figure 4:
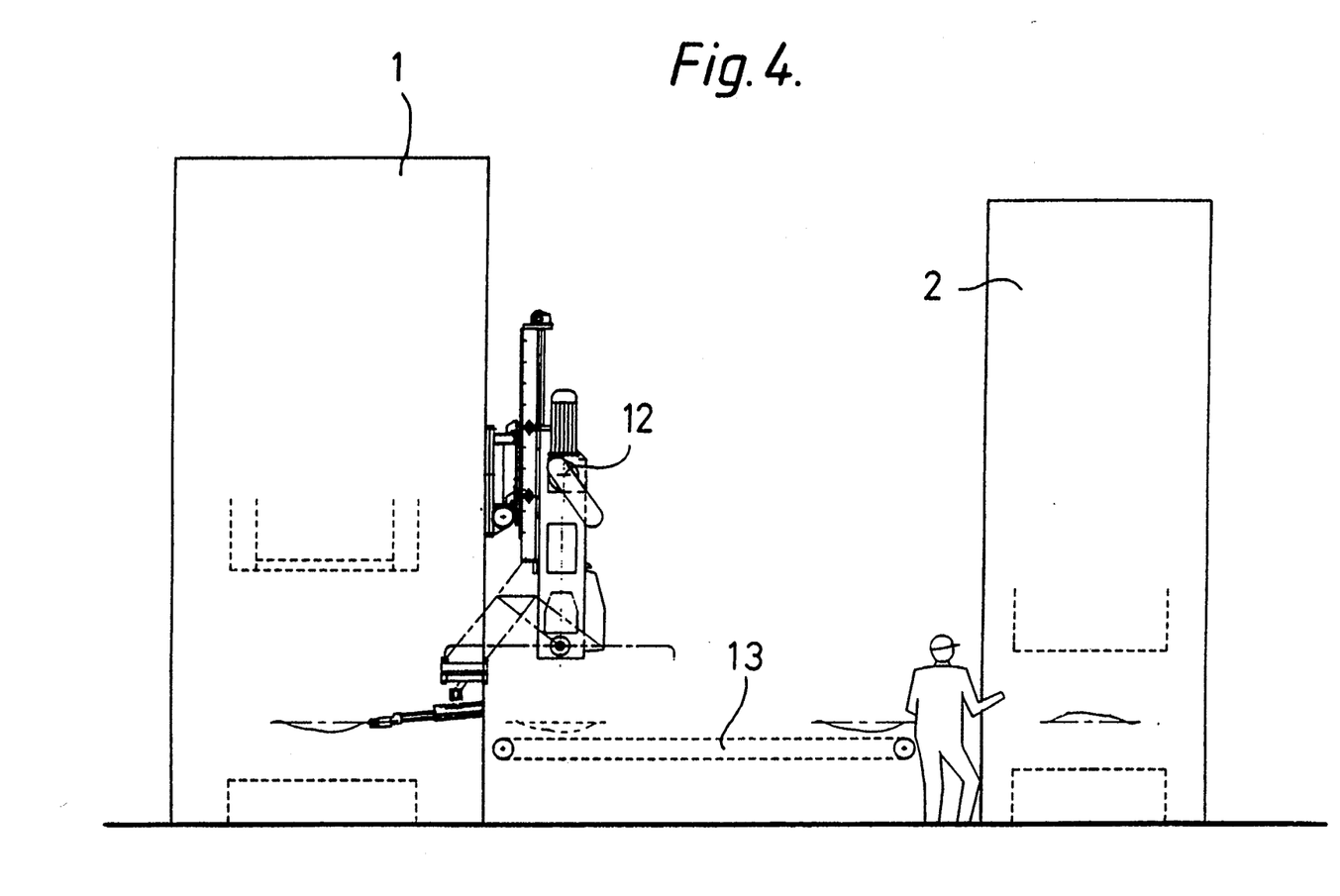
FIG. 4-7 show alternative embodiments of the present invention.

FIG. 4 shows an alternative embodiment of the present invention and it will be apparent from this Figure that the press 1 is fitted with a discharge device 12 which, within the press, grasps the workpiece in the tool and transfers it to a conveyor 13 which, according to the invention, is suspended in the carriage (not shown) and which, in this embodiment, is designed as a belt conveyor. It will further be apparent from the Figure that the press 2 lacks an infeed device and that infeed may instead be effected manually in this instance.

Figure 5:
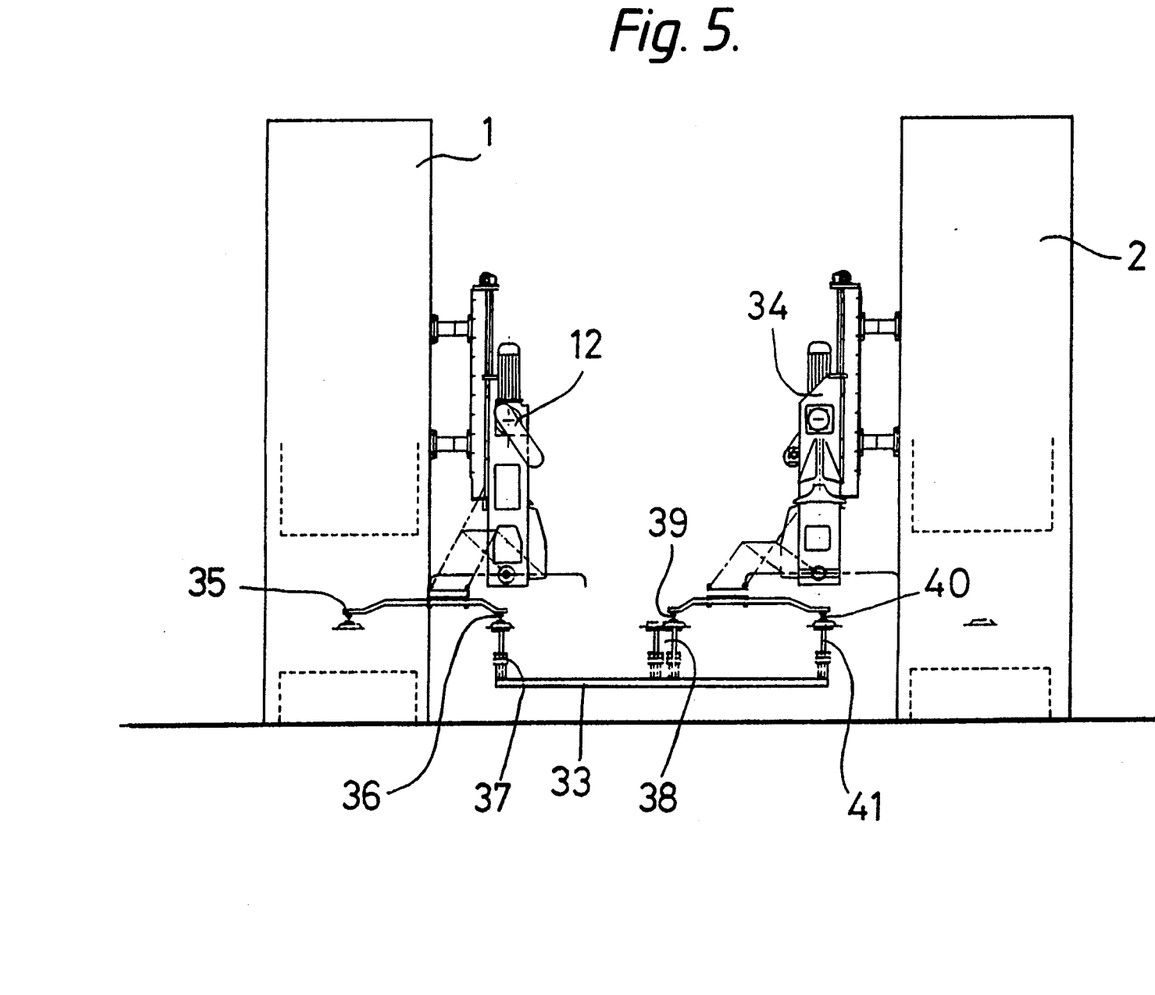

FIG. 5 shows yet a further embodiment of the present invention, it being apparent from this Figure that the press 1 is provided with a discharge device 12, the press 2 having an infeed device 34. In this embodiment, the transport equipment consists of the infeed and discharge devices, respectively, and the transfer device intimated under reference numeral 33, this device being carried by the carriage (not shown). In this embodiment, the discharge device 12 is provided with gripping members, in which the one gripping member 35 is located in a position within the press 1 in order there to grasp a workpiece, while the second gripping member 36 is located in a position above a first fixed table 37 in order there to grasp a workpiece and transfer it to a second movably disposed table 38. The infeed device 34 is disposed in a position to grasp a workpiece from the table 38 using the gripping member 39. Furthermore, the infeed device 34 has a gripping member 40 which is located in a position to grasp a workpiece from the fixed table 41 and transfer this to the tool in the press 2. As an alternative in the above-outlined design, the table 38 may be provided with a displacement arrangement which displaces a workpiece resting thereon from that position where it is deposited by the gripping member 36 to that position where it is grasped by the gripping member 39.

Figure 6:
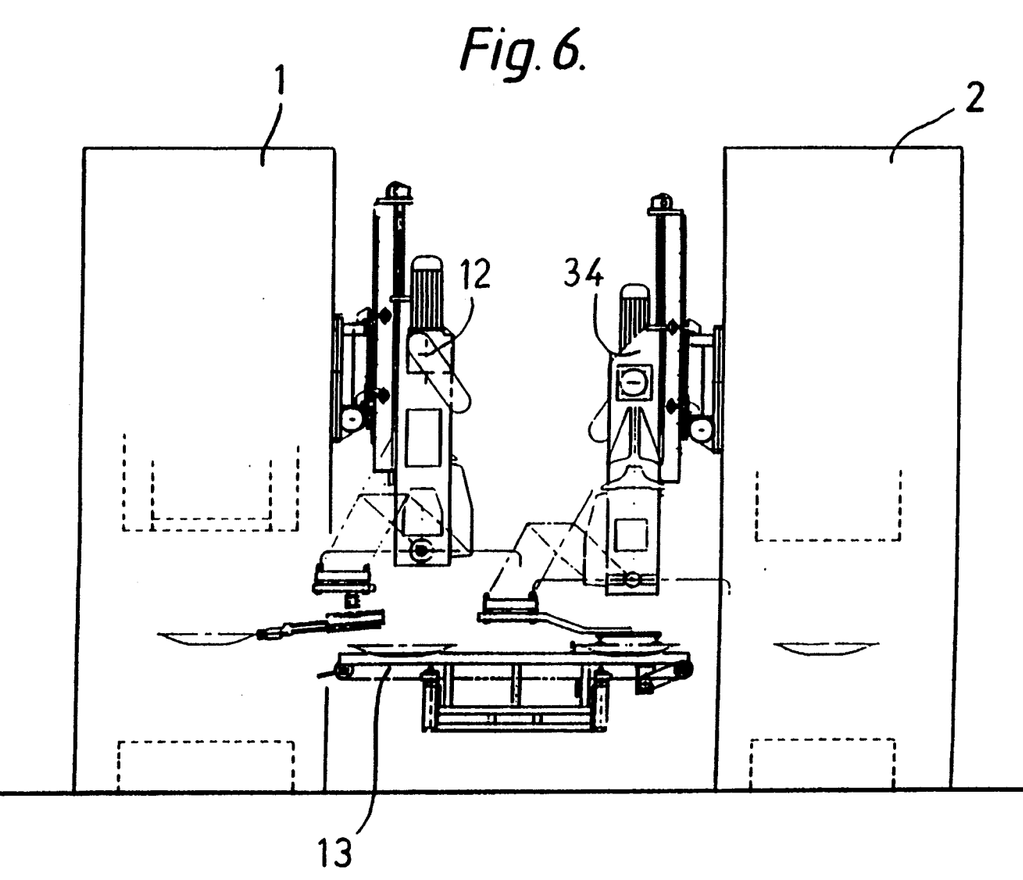

In the embodiment according to FIG. 6, the press 1 is provided with a discharge device 12 and the press 2 with an infeed device 34. The transfer device 13 mounted on the carriage (not shown) is, in this embodiment, designed as a conveyor 13 which displaces the workpieces from the output position of the discharge device 12 to the gripping position of the infeed device 34. Hence, in this embodiment the transport equipment includes the feeding devices disposed on the presses, as well as the transfer device, i.e. the conveyor 13.

Figure 7:
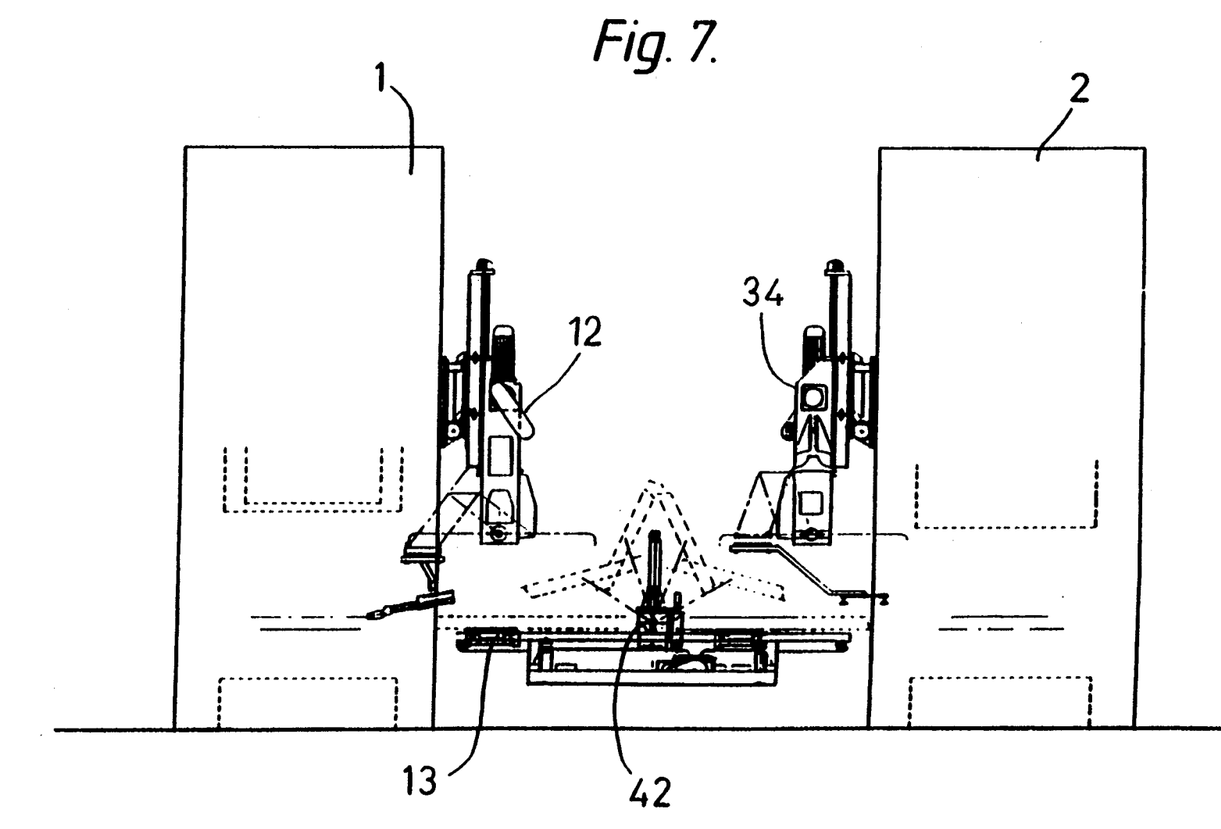

The embodiment illustrated in FIG. 7 includes a discharge device 12 on the press 1 and an infeed device 34 on the press 2. These feeding devices are included in the transport equipment which further comprises a transfer device designed partly to displace a workpiece by means of a conveyor 13 and partly to invert the workpiece by means of a tilter 42.

In the foregoing, non-restrictive examples have been disclosed with reference to FIGS. 4–7 of how the transport equipment may be designed, and it will be apparent to the skilled reader that, irrespective of the design of this transport equipment, there is always, according to the invention, at least a certain lowest common denominator thereof mounted on the carriage 8 or connected thereto, namely the transfer device. Generally, this may be designed for transport of the workpiece along one or more of the axes 30–32 illustrated in FIG. 1, and it may likewise be designed for rotating the workpiece about any of these axes. Furthermore, both the displacement movement and the rotary movement may, of course, be divided up into several different steps.

Thus, the exact design of the transfer device may vary within the scope of the present invention and, in yet a further example, the transfer device may consist of an industrial robot (IR) disposed on the carriage 8. This IR may also constitute the entire transport equipment but may also cooperate with feeder devices placed on either or both of the presses.

We claim:

1. An arrangement in a press line for producing vehicle body parts, comprising:
   at least two presses disposed in spaced sequence along a material feed direction for stepwise processing of a workpiece;
   tracks extending between adjacent presses transverse to the material feed direction;
   a carriage associated with each press, each carriage being drivable on said tracks at least between a first position and a second position, each carriage having relative to the tracks direction a first and a second end portion;

transfer means for transferring a workpiece from one press to the next in the press line, said transfer device being arranged on the second end portion of the carriage for operation when the carriage is in the second position, wherein the second end portion has cantilever means for supporting the transfer means away from the second end portion in the track direction to provide a free space below the transfer means; and, tool change means for transferring a tool to a press for use and from a press after use, said tool change means being disposed on the first end portion of the carriage for operation when the carriage is in the first position.

2. The arrangement of claim 1, wherein the transfer device is provided with a support member for stabilizing the transfer device on a support surface external to the carriage.

3. The arrangement of claim 1, wherein the carriage is drivable at least between a workpiece operative position where the second end portion with the transfer device is positioned for transferring workpieces between two adjacent presses, and a tool change operative position where the first end portion of the carriage, with said tool change means, is positioned for changing a tool at a press, and wherein the second end portion is, in the tool change operative position, at least partly outside of a space between adjacent presses.

4. The arrangement of claim 1, wherein the carriage is drivable to a third position for collecting and depositing a tool in a tool store located in spaced relationship to the press line.

5. The arrangement of claim 1, wherein the carriage has a free space between its first and second end portions.

6. The arrangement of claim 1, wherein the transfer device is movable between a lower operative position and an upper rest position.

7. The arrangement of claim 1, wherein the transfer device is displaceably connected to the carriage for extending horizontally in the direction of the tracks.

8. The arrangement of claim 1, wherein at least one of the presses cooperating with a transfer device is provided with a feeder device for removal and discharge of a workpiece from a tool disposed in the press to the transfer device, and for receiving a workpiece from the transfer device and insertion of the workpiece in a tool disposed in the press.

9. The arrangement of claim 1, wherein said transfer device includes means for selectively displacing the workpiece along a horizontal axis parallel to the material feed direction, a horizontal axis transverse to the material feed direction and a vertical axis normal to the material feed direction.

10. The arrangement of claim 1, wherein said transfer device includes means for rotating the workpiece about a horizontal axis parallel to the material feed direction, a horizontal axis transverse to the material feed direction and a vertical axis normal to the material feed direction.

11. An arrangement in a press line, primarily for producing vehicle body parts, comprising:

at least two presses disposed in spaced sequence along a material feed direction for stepwise processing of a workpiece;

tracks extending between adjacent presses transverse to the material feed direction;

a carriage associated with each press, each carriage being drivable on said tracks at least between a first position and a second position, each carriage having relative to the tracks direction a first and a second end portion;

transfer means for transferring a workpiece from one press to the next in the press line, said transfer device being arranged on the second end portion of the carriage for operation when the carriage is in the second position;

tool change means for transferring a tool to a press for use and from a press after use, said tool change means being disposed on the first end portion of the carriage for operation when the carriage is in the first position;

said transfer means including means for displacing the workpieces along at least one of a horizontal axis parallel to the material feed direction, a horizontal axis transverse to the material feed direction, and a vertical axis normal to the material feed direction, wherein the means for displacing the workpieces includes rotating the workpieces on at least one of a horizontal axis parallel to the material feed direction, a horizontal axis transverse to the material feed direction, and a vertical axis normal to the material feed direction.

12. The arrangement of claim 11, wherein the carriage is drivable to a third position for collecting and depositing a tool in a tool store located in spaced relationship to the press line.

13. The arrangement of claim 11, wherein the transfer device is provided with a support member for stabilizing the transfer device on a support surface external to the carriage.

14. The arrangement of claim 11, wherein the carriage is drivable at least between a workpiece operative position where the second end portion with the transfer device is positioned for transferring workpieces between two adjacent presses, and a tool change operative position where the first end portion of the carriage, with said tool change means, is positioned for changing a tool at a press, and wherein the second end portion is, in the tool change operative position, at least partly outside of a space between adjacent presses.

15. The arrangement of claim 11, wherein the carriage has a free space between its first and second end portions.

16. The arrangement of claim 11, wherein the transfer device is movable between a lower operative position and an upper rest position.

17. The arrangement of claim 11, wherein the transfer device is displaceably connected to the carriage for extending horizontally in the direction of the tracks.

18. The arrangement of claim 11, wherein at least one of the presses cooperating with a transfer device is provided with a feeder device for removal and discharge of a workpiece from a tool disposed in the press to the transfer device, and for receiving a workpiece from the transfer device and insertion of the workpiece in a tool disposed in the press.

19. The arrangement of claim 11, wherein the second end portion has cantilever means for supporting the transfer means away from the second end portion in the track direction to provide a free space below the transfer means.

* * * * *